May 25, 1937. W. L. HICKSTEIN ET AL Re. 20,380

CONTROL DEVICE

Original Filed Dec. 12, 1930

Inventors
Edwin C. Loesser
William L. Hickstein
By H. H. Snelling
Attorney

Reissued May 25, 1937

Re. 20,380

UNITED STATES PATENT OFFICE 20,380

CONTROL DEVICE

William L. Hickstein, Irvington, and Edwin C. Loesser, Glen Ridge, N. J.

Original No. 1,985,659, dated December 25, 1934, Serial No. 501,983, December 12, 1930. Application for reissue December 24, 1936, Serial No. 117,678

34 Claims. (Cl. 200—84)

This invention relates to control devices which may govern mechanism of any type. In the particular embodiment we have illustrated, the invention is applied to an oil burning steam heater as our first commercial devices were used in connection with that mechanism. The invention, however, is of broad scope and may either shut off or initiate the movement of any chosen mechanism or it may operate a make and break device and in the latter case obviously some installations will require that the current be broken whereas other quite similar installations will require that under the same conditions the circuit be completed. The primary object of this invention is to provide a device that will operate in some fashion entirely automatically and in response to either of two movements substantially at right angles to each other or to the combined movements. A second and important object of the present invention is the provision of an automatic switch which will be operated by a horizontal movement of the control device to open or close the switch and in addition will be operated to open or close the device independently of the first movement if the control rod be moved in a different direction.

A still further object of the present invention lies in the provision of an automatic device for control of the motor of an oil burner by either change in pressure or change in water level or both.

In many installations it is common to cut off the heat when the steam pressure or the temperature reaches some chosen maximum point and to turn on the heat either by moving a valve or starting a motor when some chosen minimum is reached and the installation generally contains in addition a separate switch which closes the valve or stops the motor whenever the water level sinks below a certain chosen point. While the two devices working together are very common there is no simple compact automatic control unit for accomplishing both purposes.

Figure 1:
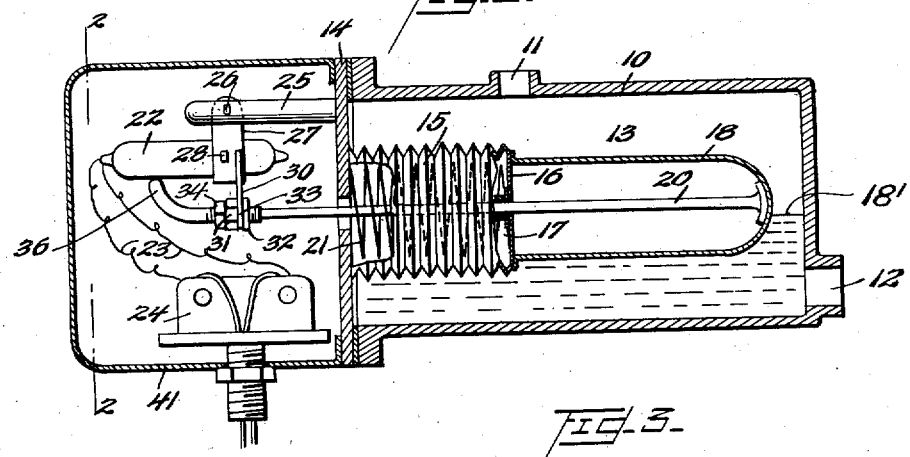
Figure 1 is a side elevation partly broken away.
Figure 2:
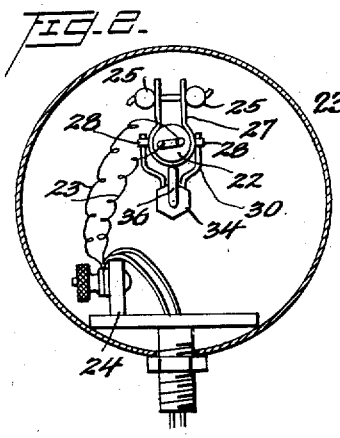
Figure 2 is an end view of the preferred apparatus as shown in Figure 1 but with the cap removed.

In the preferred form shown in Figures 1 and 2, the device consists in a casting 10 having a steam inlet nipple 11 and a water inlet 12, the former in communication with the steam chamber of the boiler and the latter in communication with the water which is being heated. The pressure in the chamber 13 will, therefore, be the same as the pressure in the steam line and the entire device is so located that the chosen water level is at the longitudinal center line of the cylindrical casting 10.

To the open end of the casting 10 is secured a disk 14 permanently carrying a corrugated metal cylinder 15 hereinafter called the bellows. The circular end 16 of the bellows is preferably of slightly heavier metal than the corrugated portion and this disk carries centrally a bearing or collar 17 and carries near its periphery a float 18. While obviously the float 18 may be spaced away from the bellows as in our earlier models, we find it convenient to build the float in the short test tube form illustrated and to fasten it securely and permanently to the bellows and also to the rod 20 which fits rather snugly in the bearing or collar 17 on the wall 16.

From the above it will be seen that the chamber 13 is fluid and liquid tight and that when the steam pressure entering thru port 11 increases the bellows will be made shorter and since the bellows carries the float and the rod 20 is attached to the float at its far end any increase of pressure will move the rod 20 in an axial direction and any decrease in pressure, augmented, if desired, by the optional helical spring 21 which we find unnecessary with the rather low pressure encountered in oil burning heaters, the rod 20 is moved horizontally to the right as seen in Figure 1. A further and totally independent movement of the rod follows changes in the water level. As illustrated the water level is at the desired height. Should the water level sink in the main device the water level in chamber 13 would respond at once and the float 20 would fall but since the bellows is fast to the closure disk 14 the rod 20 will turn about an axis located between the wall 14 and the wall 16, the location of this axis changes with the amount of compression of the bellows. The bellows, being readily bendable, will permit the necessary tilting of the end wall 16 as will readily be understood by those familiar with these elements. It will thus be seen that the central rod 20 will move axially in response to pressure changes and will tilt about some intermediate point in response to water level changes. In other words, the float has universal movement.

In the preferred form the object which is controlled by movement of the rod is an electric make and break apparatus of the mercury type known in the trade as a mercoid switch. This tube is given the numeral 22 and receives its currents thru wires 23 leading to an outlet box 24. While the tube itself is of well-known commercial form its mounting is novel. The removable end wall 14 of the pressure chamber carries the outlet box at the bottom and two parallel brackets 25 at the top, the free ends of which are connected by a pivot rod 26 on which is swung a cradle 27 which is merely a strap of material preferably spring metal to embrace rather firmly the tiltable mercury tube switch element 22. At each side and diametrically of the tube is an outwardly extending lug 28 positioned so as to be engaged by a rather heavy wire frame 30 adjustably carried on the control rod 20. We prefer to have the engagement between the lug 28 and the frame 30 adjustable because in this way we can use the same device for many different types of installation. A very convenient way of achieving this purpose is by having a portion of the control rod 20 threaded and on this threaded portion we locate a nut 31 having an extended sleeve 32 which is annularly grooved to receive the nearly circular end 33 of the fork frame 30. The frame being of spring steel can be adjusted manually after the nut is correctly set so as not to engage either the tube or the sides of the cradle 27 and preferably the nut 31 would be held in chosen position by some positive means such as the lock nut 34. Upon decrease of pressure in the chamber 13 the rod 20 moves to the right and the space between the lug 28 and the vertically standing arms of the fork 30 increases. When, however, the pressure increases within the chamber the entire rod is moved to the left and at the chosen pressure the frame strikes the two lugs 28 and tilts the mercury tube switch element 22 about its pivot 26 and this act causes the current to be broken if the two contacts in the mercoid tube are near the left hand edge or cause the current to be made if the contact should be in the other end of the tube. As illustrated the contacts are in the left hand end and the pressure breaks the electric current which in this case goes to the motor and the stopping of the motor in turn cuts off the supply of liquid fuel. When the pressure or temperature decreases the bellows 15 expands and the current is again completed to the motor.

The same mercury tube switch element 22 responds independently to a change in water level. The control rod 20 at its extreme left hand edge is bent upwardly as at 36. We do not find it necessary to fork this end but the rounded free end strikes the tube at its lowest point and with pressure changes merely slides horizontally on the tube having no effect whatsoever upon it. Should the water level drop, however, the end 36 of the control rod is elevated and this tilts the mercury tube 22 in exactly the same way as does the engagement between the frame 30 and the lugs 28. It will be noted that the upturned end 36 of the control rod also acts as a stop for the switch. Except for this provision it would be necessary to have some means for preventing the heavier left hand end of the tube moving downwardly.

Figure 3:
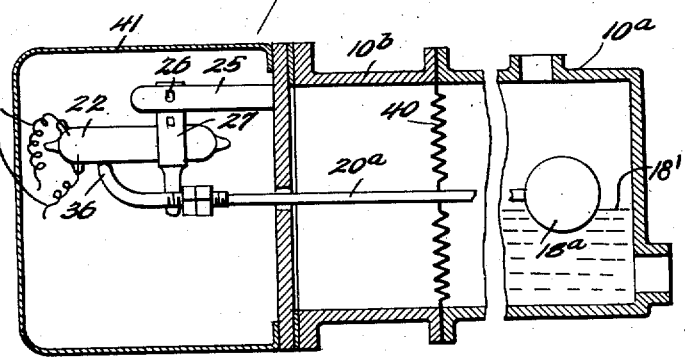
Figure 3 is a side elevation of a modified form.
Figure 5:
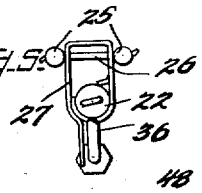
Figure 5 is an end view of the switch cradle.
Figure 4:
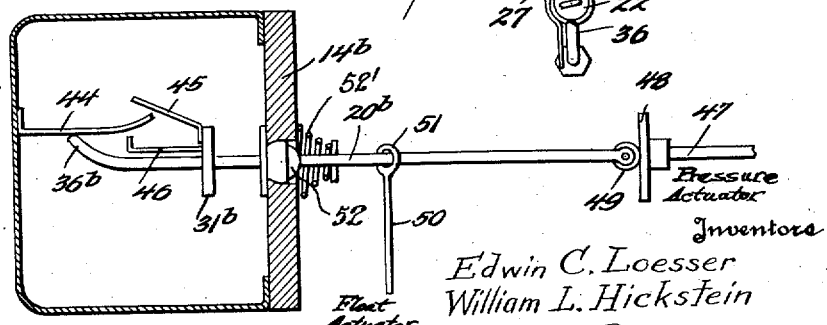
Figure 4 is a still further modification.
Figure 6:
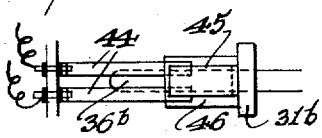
Figure 6 is a plan of the contact members shown in Figure 4.

In Figure 3 the casing is made in two parts 10[a] and 10[b] binding between them in fluid tight manner a circularly corrugated disk 40 to which the control rod 20[a] is permanently secured. The float 18[a] in this case is spaced from the diaphragm disk 40 but the operating mechanism in the left hand space is identical and, as in the preferred form, it is covered by a readily removable light cap 41 which may, if desired, be of glass or other transparent material. In Figure 4 the mercury switch is replaced by a pair of spaced terminals 44 which are bridged to complete the circuit by the upturned end 36[b] of the control rod 20[b]. The frame 30 has its counterpart in a cam surface 45 which presses two spring leaf terminals 44 downward into contact with an electrically conducting bridging member 46 carried on the control rod preferably in an adjustable manner as by the nut 31[b]. In this modification the member 47 moves horizontally in accordance with some change in conditions as, for example, a change in pressure. The rod carries a plate 48 which may engage a roller 49 on the control rod which is spring pressed against the plate 48 so as to move the control rod horizontally against the spring. The member 50 corresponds to the float and it moves vertically in accordance with some change in conditions as, for example, the water level. This member 50 ends in a ring 51 which rather snugly embraces the control rod which slides freely in a spherical bearing 52 set in a wall 14[b]. As in the other modifications the circuit is completed or is broken as may be desired upon a movement of the member 47 in one direction and by a movement of the member 50 in a direction at right angles to the movement of the member 47.

Referring again to Figure 1 it will be seen that in the preferred embodiment of our invention we have produced a float having completely universal movement and one that is of economical design and may be made, installed and repaired at the expense of minimum time and labor.

What we claim is:

1. A device operated by changes in water level and pressure, comprising a float, a pressure responsive element secured to said float, means actuated by the float in response to changes in liquid level, said means so connected to the pressure responsive element as to be actuated thereby independently of the liquid level changes.

2. In combination, a float, a pressure responsive device, an operating element, a mercury switch tube and a cradle therefor, said tube and cradle forming a pivoted crank of which the tube is the substantially horizontal arm and the cradle is the substantially vertical arm, said operating element being pivotably supported by the pressure responsive device and so connected to the float as to be actuated by changes in liquid level, the operating element being positioned to move against the vertical arm of the suspended crank when actuated by the pressure responsive device, and positioned to move against the horizontal tube when actuated about its pivot by the float.

3. A bellows and a float fixedly secured thereto in combination with a rod to produce a movement of one end thereof in two directions normal to each other.

4. A diafragm and a float in combination with one end of a rod to produce a movement of the other end of the rod in two directions normal to each other.

5. The combination with a member to operate a control device, of actuating means to move the member in one direction in accordance with a changed condition, and a second actuating means fixedly secured to said first mentioned means to move the member at an angle to such direction in accordance with a different changed condition.

6. In a device for completing an electrical circuit, a rod, a bearing in which the rod is slidably and pivotally supported, and means located on one side of said bearing moving substantially normally to each other for moving the rod in and about its bearing.

7. In a pressure operated switch controlling device, a pivoted cradle, a pressure responsive member, a rod connected to said member, a cam adjustably secured on said rod to tilt the cradle upon increase of pressure, and means at the end of the rod for holding the cradle at horizontal.

8. In combination, a cylindrical bellows compressible under pressure, a float secured to the bellows, and a rod fast to the float and passing axially thru the bellows.

9. In combination, a corrugated metal pressure responsive cylinder closed at one end, a perforated wall supporting the cylinder at the other end in fluid tight fashion, a rod passing thru the hole in the wall and passing axially thru the cylinder, and a float secured to the free end of the rod.

10. In combination, a chamber adapted to be placed in communication with a fluid reservoir and a pressure system, a pressure responsive diafragm closing one side of said chamber, a member pivoted to said diafragm and a float secured to the member and lying within the chamber.

11. In a switch, a pair of contacts, a bridging member mounted to join said contacts upon lowering of a water level, a second bridging member and pressure responsive means to cause the second bridging member to join said contacts.

12. In combination, a chamber having a steam port and a water port, a float within said chamber, a pivoted lever carrying said float, pressure responsive means for moving the pivot of the lever in horizontal direction, a tiltable member supported by the lever, and means for translating the sliding movement of the lever into tilting movement of the member independently of the support given the tiltable member by the lever.

13. In combination, a rod adapted to open and close an electric switch, means responsive to pressure changes to move the rod, and a float secured to said rod to move the rod in response to changes in liquid level.

14. An electric switch, a rod, a pressure responsive member secured to said rod to move the rod axially to operate said switch, and a float directly secured to said rod to operate said switch in accordance with liquid level changes.

15. A switch operating unit consisting of means responsive to liquid level changes and means responsive to pressure changes, and a switch engaging member rigidly secured to both of said means to move constantly therewith.

16. In combination, a member having a free end adapted to be operatively connected to a desired mechanism, actuating means located at a fixed distance from said free end and responsive to liquid level changes for moving the free end of said member, and means responsive to pressure changes to move the free end of the member, said first mentioned means being so connected to said member as to maintain said fixed distance during all changes in pressure and liquid level.

17. In combination, a chamber having an opening in one wall, a pressure responsive device sealing said chamber, a rod centrally pivoted in said device, a float within the chamber and secured to one end of the rod, the free end of said rod extending thru said opening, a switch adjacent to said free end and adapted to be operated thereby upon movement of the rod by pressure on the device or by change in water level in said chamber.

18. A combined pressure and float actuated switch mechanism for boilers, comprising a casing having means for communicating with the interior of a boiler above and below the water level thereof, an electric switch mechanism including a mercury tube switch and operating means for throwing the switch tube to open and closed positions, an expansible and contractible member within the casing and connected to said switch operating means whereby a change of pressure in the casing actuates the switch actuating means, in combination with means within the casing including a float, said switch operating means connected to and communicating the movement of said float to the exterior of the casing whereby changes in the water level in the boiler actuate the switch.

19. In combination, a casing, an apertured closure on one end of the casing, a pressure responsive bellows secured to said closure over said aperture and extending within the casing, a float secured to the inner end of the bellows, a rod connected to the bellows and to the float and extending thru said aperture and switch means mounted adjacent the free end of the rod whereby movement of the rod due to pressure change and water level change or both operates said switch.

20. In combination, a cylindrical bellows having a closed end and an open end, a float sealed to said closed end, a rod secured to said closed end, a water level casing having an apertured wall and means for securing said open end of the bellows to said wall whereby the bellows, the float and the rod are supported by the wall, said rod extending from said closed end axially thru the bellows and thru said wall and means mounted exterior of said casing adapted to be operated by axial and transverse movement of the free end of said rod.

21. A device operated by changes in water level and pressure, comprising a pressure responsive element, a float supported by said element, means actuated by the float in response to changes in liquid level, said means being fixedly secured to the pressure responsive element whereby changes in pressure actuate said means independently of change in liquid level.

22. In combination, a water level casing having an apertured wall, a pressure responsive bellows within the casing secured to the wall, a float secured to the bellows, a rod secured to the float and thereby to the bellows and extending thru the apertured wall, and a switch mounted on said casing adjacent the free end of said rod and adapted to be operated thereby.

23. A combined pressure and float actuated switch mechanism for boilers, comprising a water level casing, a pressure responsive device and a float within the casing, an electric switch mechanism including a mercury switch tube suspended in a pivoted cradle, a unitary means for moving the tube into open and closed positions, said means being connected to the pressure responsive device and float on the interior of the casing whereby change in pressure or change in water level will actuate said switch.

24. A combined pressure and float actuated mechanism for boilers, comprising a casing provided with means for communicating with the interior of a boiler above and below the water level thereof, an electric switch mechanism including a mercury switch tube pivotally supported by said casing, unitary operating means for moving the switch tube into open and closed positions, a pressure responsive device of the bellows type secured to the inner wall of the casing and a float within the casing, said float and said device being connected together and to said switch operating means whereby either change in pressure or change in water level or both will move said operating means to actuate said switch.

25. In a mercury tube switch having but two moving parts, a support, a cradle freely suspended on a pivot in said support, a mercury tube resiliently clamped in said cradle and adapted to hang in a substantially horizontal position below said pivot, a pivoted rod, float means on one end of said rod for turning the same about its pivot to bring the free end thereof into engagement with said tube to thereby actuate the switch.

26. In a mercury tube switch, a support, a cradle freely suspended on a pivot in said support, a mercury tube resiliently clamped in said cradle and adapted to hang in a substantially horizontal position below said pivot, a pivoted rod, float means on one end of said rod for turning the same about its pivot to bring the free end thereof into engagement with said tube to thereby actuate the switch, means for moving said rod and its pivot longitudinally, and means on the rod for engaging said cradle during said longitudinal movement to thereby actuate the switch.

27. In a water level responsive control, a float having a cylindrical shape, means for resiliently supporting said float in a horizontal position whereby it may have universal movement, said means comprising a cylindrical bellows having on one end a centrally apertured plate for fixedly mounting the same and having the free end sealed to the float, and switch means carried by said float.

28. In a water level responsive control, a liquid chamber having an apertured wall, means for connecting said chamber to a liquid container and for providing communication therewith whereby the liquid level of a container may be transmitted to the chamber, a float in said chamber, means for mounting the float for completely universal movement, said float mounting means comprising a bellows having one end fixedly mounted on said apertured wall and covering the aperture therein thereby providing access to the interior of said bellows from outside of the chamber, the free end of said bellows being connected to said float and switch means operatively associated with said float whereby to be actuated by the change in liquid level in the chamber.

29. In a water level responsive control, a chamber, pipe means for connecting said chamber to a water boiler whereby the water level of the boiler may be transmitted to the chamber, a removable wall for said chamber, a horizontal cylindrical bellows within the chamber connected at one end to said wall, and free at the other end, a float connected to the free end of said bellows, the interior of said bellows having communication with the atmosphere and switch means adapted to be operated by said float as it changes position with the change in water level.

30. In a liquid level responsive control, a chamber adapted for connection with a variable level liquid supply whereby the liquid level may be reflected in the chamber, said chamber having an apertured end wall, a horizontal cylinder within the chamber having one end sealed to said wall whereby the aperture permits communication between the atmosphere and the interior of the cylinder, the opposite end of said cylinder being free, the portion of said cylinder adjacent the wall being deeply corrugated forming a bellows and the opposite or free end of the cylinder being closed whereby said cylinder acts as a float, and switch means operatively associated with the cylinder whereby upon change in liquid level the switch is actuated.

31. A switch actuating device comprising a float and a cylindrical bellows open at one end to the atmosphere and closed at the other end by a wall of said float.

32. In a water level responsive device a float and means for resiliently supporting the float comprising an elongated horizontal bellows rigidly mounted at one end and secured to the float at the other end, said bellows serving to increase the buoyancy of the float.

33. A switch operating unit for boilers comprising a bellows having its interior exposed to atmospheric pressure and compressible under pressure on its exterior surface, means for exposing the exterior surface of the bellows to boiler pressure, a float carried solely by said bellows whereby the float has substantially free universal movement and a switch operatively associated with said float and bellows.

34. In a switch mechanism adapted to be actuated by change in liquid level, a chamber having means for connecting with a liquid container whereby a change in liquid level in the container may be reflected in the chamber, an apertured wall for said chamber, a bellows within the chamber sealed at one end to said wall over said aperture whereby the aperture provides communication between the atmosphere and the interior of the bellows, said bellows adapted to expand and contract on an axis passing through said wall, the other end of said bellows being free to move in any direction and a float secured to said other end whereby upon any change in water level the float is adapted to move at an angle to the axis of the bellows, said float being secured solely by said bellows and thereby having universal movement.

WILLIAM L. HICKSTEIN.
EDWIN C. LOESSER.